United States Patent [19]

Merkel et al.

[11] 3,910,983

[45] Oct. 7, 1975

[54] PROCESS FOR THE PRODUCTION OF CHLOROFORMIC ESTERS

[75] Inventors: Karl Merkel; Joachim Datow; Juergen Paetsch, all of Ludwigshafen; Herwig Hoffmann, Frankenthal; Siegfried Winderl, Heidelberg, all of Germany

[73] Assignee: BASF Aktiengellschaft, Ludwigshafen (Rhine), Germany

[22] Filed: Oct. 17, 1973

[21] Appl. No.: 407,297

[30] Foreign Application Priority Data

Oct. 19, 1972 Germany.............................. 2251206

[52] U.S. Cl. ................................................. 260/463
[51] Int. Cl.² ......................................... C07C 68/00
[58] Field of Search .................................... 260/463

[56] References Cited

UNITED STATES PATENTS

| 3,275,674 | 9/1966 | Bottenbruch et al. | 260/463 |
| 3,299,115 | 1/1967 | Weber, Jr. | 260/463 |

FOREIGN PATENTS OR APPLICATIONS

| 800,662 | 11/1950 | Germany | 260/463 |

Primary Examiner—Joseph P. Brust
Attorney, Agent, or Firm—Johnston, Keil, Thompson & Shurtleff

[57] ABSTRACT

A process for the continuous production of esters of chloroformic acid from an alcohol, particularly a polyhydric alcohol, and phosgene, the process being carried out in an excess of phosgene and the alcohol being mixed in within a particularly short period of time.

8 Claims, 1 Drawing Figure

U.S. Patent  Oct. 7,1975  3,910,983
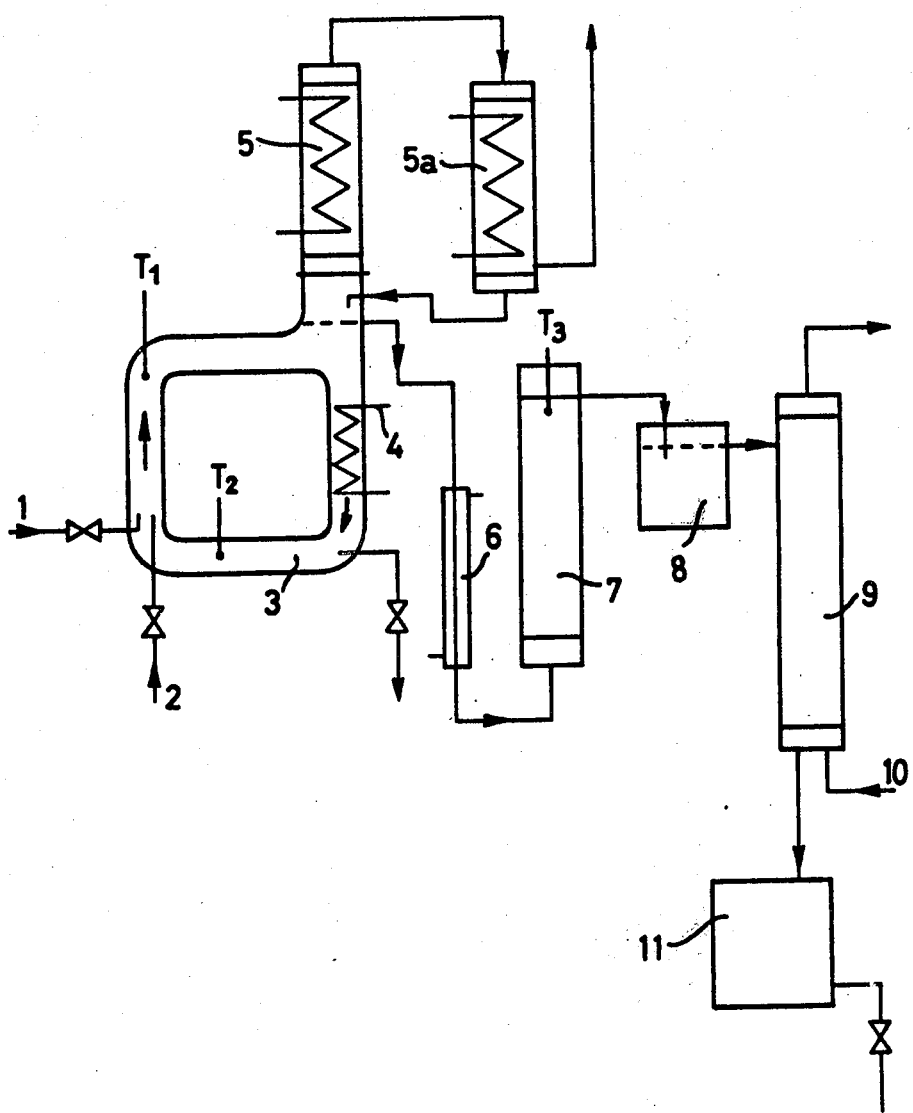

PROCESS FOR THE PRODUCTION OF CHLOROFORMIC ESTERS

Chloroformic esters (also known as chlorocarbonates of chloroformates) of the general formula $[Cl(CO)O]_n R_{(n)}$ are obtained by reaction of a compound containing an alcoholic grouping $(R(OH)_n)$ with phosgene $(COCl_2)$. The reaction may be catalyzed by Bronsted acids or bases; the hydrogen chloride formed in the reaction is also an effective catalyst so that the reaction can proceed without a catalyst having to be provided.

Chloroformates and particularly those of polyhydric alcohols in which $n$ has a value greater than 1 and particularly 2 are required in high purity; they are used for example for the production of organic polycarbonates. Since subsequent purification of the chloroformates is hardly possible because of their sensitivity it is important that the process for the production of the chloroformates should if possible yield no byproducts.

For example in the reaction of diglycol: $HO(CH_2CH_2O)_2-H$ (I) with phosgene not only the desired diester is formed but also the chlorinated compounds $CL(CO)O-CH_2CH_2-O-CH_2CH_2Cl$ (II) and $O(CH_2CH_2)_2Cl_2$ (III); further, 1,4-dioxane and the cyclic carbonate $\overline{-(O-CH_2CH_2)_2-O-C=O}$ (IV) appear. These and other impurities should, together, form not more than 0.5% to at most 1% of impurities in the chloroformates because otherwise the chloroformate obtained is useless for, for example, polymerization purposes.

German Pat. No. 800,662 discloses that the reaction between an alcohol and phosgene proceeds particularly smoothly in the presence of an excess of phosgene at low temperatures. It is also known that contamination of the reaction mixture with iron has to be avoided and that the residence time in the reaction zone should be as short as possible.

We have now found that very pure chloroformates of monohydric or polyhydric alcohols can be produced in good yields by continuous reaction of substantially equivalent amounts of phosgene with an alcohol in the presence of excess phosgene and at a temperature lower than 50°C and with a residence time of less than 60 minutes by continuously supplying phosgene and alcohol to a reaction vessel containing at any one time at least 20% by weight of phosgene in the reaction mixture in such a manner that the period for homogeneous mixing of the alcohol into the reaction mixture is less than about 5 seconds and an amount of the reaction mixture equivalent to the amount of alcohol and phosgene supplied is withdrawn. The withdrawn reaction mixture, with or without having passed through an afterreaction zone, is freed from phosgene and hydrogen chloride and the phosgene may be recycled to the reaction zone, if desired with at least some of the hydrogen chloride.

Examples of alcohols are monohydric aliphatic alcohols (e.g., alkanols) of one to 20 carbon atoms such as methanol, isopropanol, methyl glycol, ethylhexanol and stearyl alcohol; monohydric araliphatic alcohols of one to 20 carbon atoms in the aliphatic side chain such as benzyl alcohol and phenylhexanol; dihydric alcohols, particularly alkane glycols of two to twenty carbon atoms such as ethyl glycol, propyl glycol, butanediol-(1,4), butanediol-(1,3), hexanediol-(1,6) and neopentyl glycol; and their polymeric glycol ethers, particularly diglycol and triglycol; trihydric or polyhydric alcohols and particularly of three to ten carbon atoms, for example trimethylolpropane and pentaerythritol.

Suitable reaction vessels are those having very intense back-mixing such as vessels having high speed stirrers, tubular vessels and circulation evaporators. The reaction vessels may conveniently be provided with means for turbulent mixing in of the alcohol; particularly suitable pieces of apparatus are those described for example in Chemie-Ingenieur-Technik (1970), pages 474 to 479 and known as jet nozzles which permit a high homogenization energy to be exerted on the components to be mixed.

It is important that the alcohol be homogeneously distributed in the reaction mixture in less than about 5 seconds, i.e. in a reactor which has a continuous product flow the alcohol concentration at a distance from the point at which the alcohol is fed in and which corresponds to the distance travelled in five seconds by the product stream is not higher at any one point than at any other point the same distance away. The alcohol concentration at a point beyond the said distance should nowhere be higher than 3%, based on the whole mixture. It is further important that the reaction (which liberates a heat of reaction of about 10 kcal per mole of alcoholic groups) should be cooled well; in an adiabatic reaction the heat liberated would cause the temperature of the mixture to rise by at least 200°C; the reaction temperature should however never exceed 30°C not only at any one time but also locally in the reaction zone; since in general the reaction proceeds at a satisfactory rate at a temperature above 0°C, for example at from 10° to 20°C, particularly good mixing should be ensured.

The reaction mixture is conveniently composed at any one time of at least 20% by weight of phosgene, the reaction product, dissolved hydrogen chloride and not more than from 2 to 3% of free alcohol. An extraneous solvent is not necessary. For economic reasons it is not advisable for the phosgene content in the reaction mixture to be more than 60% because increased expenditure would be necessary to recover the phosgene; a content of from 30 to 45% by weight of phosgene in the reaction mixture in the first reaction zone is favorable.

The residence time of the reactants may be calculated from the amount thereof reacted per unit of time based on the utilizable contents of the reaction vessel; it is generally from 5 to 30 minutes for the first reaction zone. The excellent economics of the process are demonstrated by the reciprocal of the residence time, viz. the space-time yield. The space-time yield generally reaches at least 0.5 to 1 kg per liter of reaction space per hour.

The withdrawn reaction mixture is advantageously passed through an afterreaction zone in which a plug flow prevails (i.e. no backmixing takes place). The excess phosgene and the hydrogen chloride are then removed under subatmospheric pressure and/or by means of a stream of inert gas. According to a proposal which has hitherto not been published the hydrogen chloride liberated (which contains considerable amounts of phosgene) may be scrubbed with some of the purified chloroformate before the hydrogen chloride is passed on for conventional use, and the solution of phosgene in the chloroformate is returned to the phosgenation reaction.

The process according to the invention may be carried out advantageously for example in the plant described in simplified form hereinafter with reference to the drawing:

Through injection lines 1 and 2 liquid phosgene and alcohol are supplied to circulation reactor 3, the energy to move the product in circulation being provided and maintained by the substances supplied. Cooling system 4 keeps the temperature of the circulating material down; the difference between $T_1$ and $T_2$ may be for example from 3° to 5°C. Entrained phosgene is separated from the hydrogen chloride liberated by means of brine coolers 5 and 5a and the hydrogen chloride is then washed with chloroformate.

Withdrawn reaction product passes through cooled line 6 and afterreactor 7 into buffer vessel 8 whence it is passed into gassing means 9. Nitrogen supply line 10 makes possible the removal of phosgene down to a content of less than 0.1% in the product which is passed into reservoir 11 for storage.

The following example illustrate the invention.

EXAMPLE

A mixture of 40% by weight of phosgene and 60% by weight of diglycol dichloroformate is introduced into the plant described above whose circulation reactor has an effective capacity of 500 parts by volume (adequate for about 700 parts by weight of mixture). Then 424 parts of diglycol (equal to 4 molar equivalents) and 1,000 parts of phosgene (equal to 10 molar equivalents) are supplied per hour. Temperatures of 16° and 12°C are set up at $T_1$ and $T_2$. The reaction solution contains at any one time about 40% of phosgene and 58% of diglycol dichloroformate. The temperature in coolers 5 and 5a is kept at −25°C. 190,000 parts by volume of HCl is liberated per hour.

After the solution has passed through the afterreaction zone (which in this case consists of two parts and has a total effective capacity of 500 parts by volume) it contains about 23% phosgene. This solution is degassed at about 70°C under a pressure of about 70 millibars. The yield is quantitative within the experimental error (920 parts of ester). The product analyzes as 99.8% pure, contains less than 0.05% of phosgene and HCl and less than 0.05% of the abovementioned impurities. The space-time yield based on the effective capacity of the whole reactor is about 0.6 kg per liter per hour.

We claim:

1. In a process for production of a chloroformate of a monohydric or polyhydric alcohol by the exothermic reaction of equivalent quantities of phosgene and a monohydric alcohol having 1–20 carbon atoms or a polyhydric alcohol having 2–20 carbon atoms in a reactor wherein the reaction mixture is composed of said alcohol, phosgene, the chloroformate of said alcohol and hydrogen chloride which is liberated in the reaction, the temperature of the reaction being maintained above 0°C. and not exceeding 30°C by cooling the reaction mixture, the mean residence time of the reactants in said reactor being 5–30 minutes, the improvement which comprises continuously adding said alcohol and said phosgene to the reaction mixture under conditions of fluid movement in the reactor wherein the added alcohol is homogeneously distributed into the reaction mixture in less than 5 seconds after its addition thereto, maintaining throughout the reaction mixture a concentration of said alcohol which never exceeds 3% by weight, based on the reaction mixture, at points beyond the distance traveled by the alcohol in the reaction mixture in 5 seconds, and also maintaining a phosgene concentration of at least 20% by weight in the reaction mixture at all times.

2. A process as claimed in claim 1 wherein said alcohol is an alkanol having 1–20 carbon atoms, benzyl alcohol, phenylhexanol, an alkane glycol having 2–20 carbon atoms, a polymeric glycol ether selected from the group consisting of diglycol and triglycol, or a polyhydric alcohol having 3 to 10 carbon atoms and more than two alcoholic hydroxyl groups.

3. A process as claimed in claim 1 wherein a portion of the reaction mixture is continuously withdrawn from the reactor in a quantity equivalent to the quantities of the alcohol and phosgene which are continuously added, the phosgene and hydrogen chloride in said withdrawn portion of said reaction mixture are removed therefrom, and the phosgene is returned to the reactor.

4. A process as claimed in claim 1 wherein the reaction mixture leaving the reaction vessel is fed to an afterreaction zone in which substantially no backmixing takes place.

5. A process as claimed in claim 1 wherein a tubular vessel is used as the reaction vessel.

6. A process as claimed in claim 1 wherein the alcohol is fed into the reaction vessel by means of a jet nozzle.

7. A process as claimed in claim 1 wherein gaseous hydrogen chloride containing some phosgene is removed from the reaction mixture and is scrubbed with the formed chloroformate to remove phosgene therefrom.

8. A process as claimed in claim 1 wherein said alcohol is diglycol.

* * * * *